Figures 1, 1A:
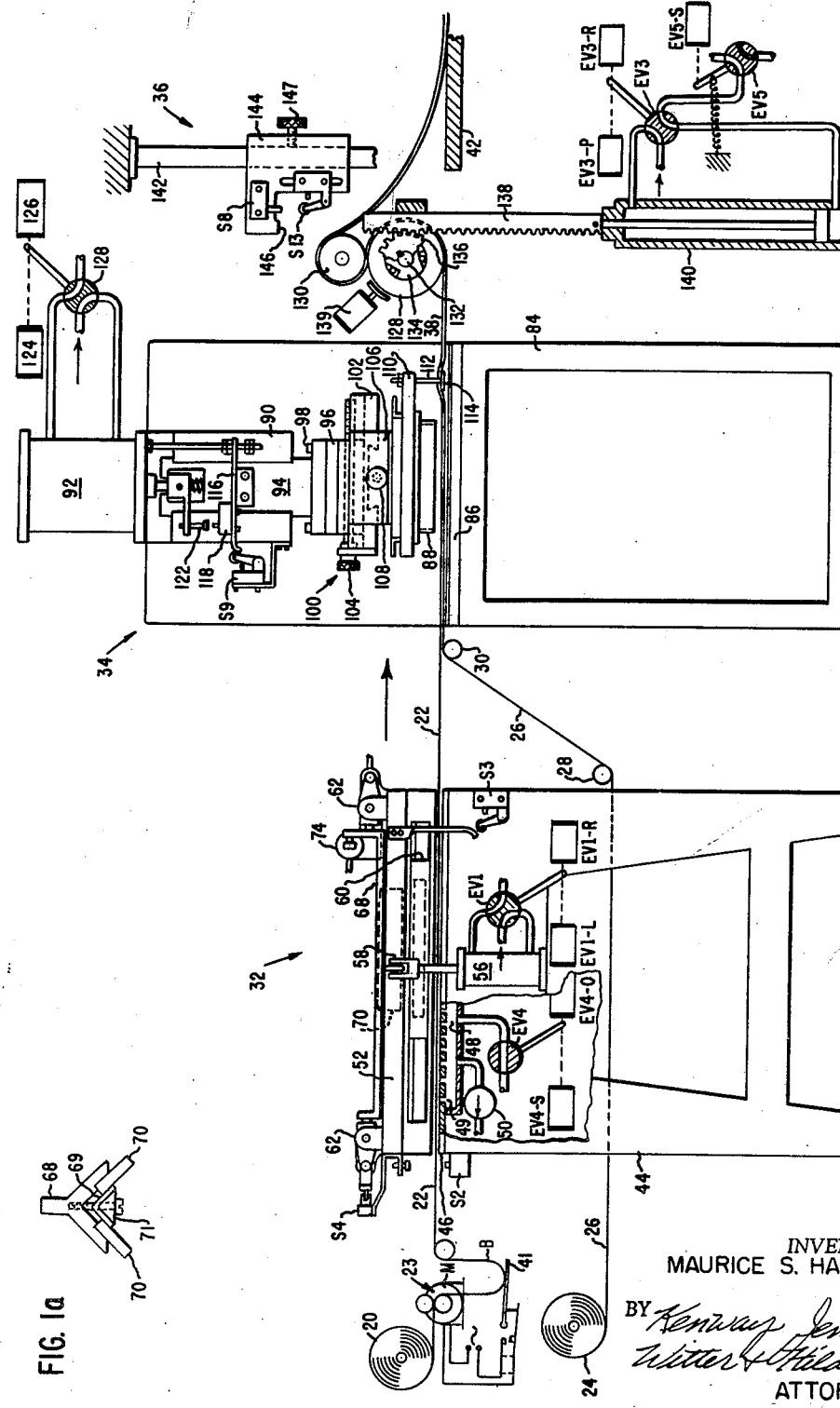

Nov. 26, 1963 M. S. HARTLEY 3,112,055
WEB-FED PRINTING AND SEALING APPARATUS
Filed Feb. 10, 1959 3 Sheets-Sheet 1

INVENTOR
MAURICE S. HARTLEY
BY
ATTORNEYS

Nov. 26, 1963  M. S. HARTLEY  3,112,055
WEB-FED PRINTING AND SEALING APPARATUS
Filed Feb. 10, 1959  3 Sheets-Sheet 2
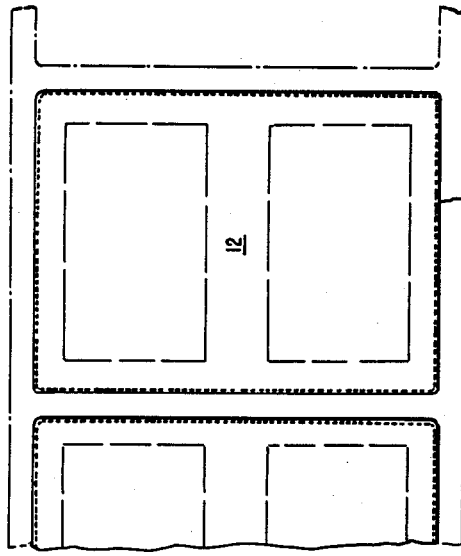
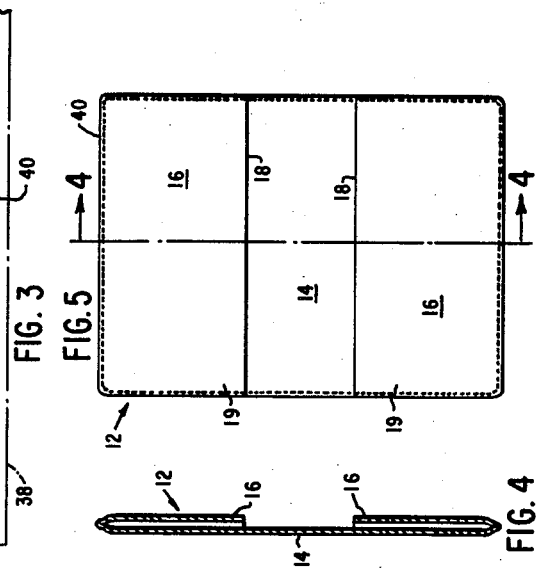
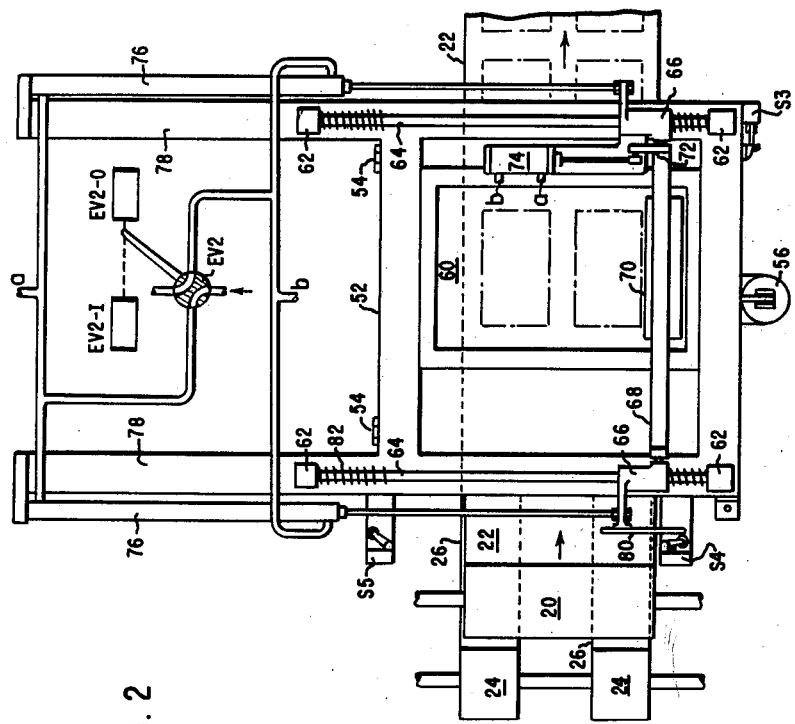
INVENTOR
MAURICE S. HARTLEY
BY
ATTORNEYS

INVENTOR
MAURICE S. HARTLEY

3,112,055
WEB-FED PRINTING AND SEALING APPARATUS
Maurice S. Hartley, Wellesley, Mass., assignor to National Manufacturing Corporation, Wellesley, Mass., a corporation of Massachusetts
Filed Feb. 10, 1959, Ser. No. 792,353
4 Claims. (Cl. 226—117)

The present invention relates generally to the art of printing upon and fabricating articles from heat fusible or heat sealable plastic sheet materials. In particular, it is concerned with a machine for fabricating articles from continuous webs which are printed upon, registered and sealed together along predetermined patterns. The invention is described with particular reference to a machine for making book covers having printed matter accurately registered with the margins thereof.

Many proposals have been advanced for fabricating inexpensive yet durable, easily removable covers for protecting books, pamphlets and the like. In many cases, it is desirable to use inexpensive material for such covers because they are intended for limited periods of use. However, the less expensive materials capable of receiving printed matter and having the requisite durability often have other features which are undesirable in manufacturing. For example, some vinyl plastic sheet materials of inexpensive grade, which have good wearing properties and appearance, are so constituted as to stretch readily upon application of tension. In web-fed fabricating machinery, this may produce serious difficulty with registration of the successive operations, particularly the printing and sealing operations.

It is accordingly a principal object of this invention to provide a machine adapted to print upon, join and seal a plurality of webs with extremely accurate registration of the printing and sealing operations.

A second and related object is to provide means of the above type that are not critical of adjustment or delicate of structure.

A third object is to provide a machine of the intermittently-fed, accurately indexed type to produce articles as described above.

A still further object is to provide means associated with the intermittent indexing to insure accuracy of indexing and to overcome the inertia of the moving parts.

With the foregoing and other objects in view, the features of the invention include an intermittent overrunning clutch drive for the webs which applies tension to draw them into contact with each other and through the printing and sealing apparatus. Each feeding step is highly accurate, being defined by the approach of a movable element to a fixed abutment.

A second feature resides in means associated with the overrunning clutch indexing drive to overcome the inertia of the driving rolls.

Another feature resides in means associated with the moving parts of the indexing mechanism which cause the mechanism to slow down after reaching a predetermined position displaced from the final limit of movement.

Still another feature resides in the use of a dielectric sealer of novel construction, wherein the movable electrode is mounted for adjustment both longitudinally and transversely of the web to insure accuracy of registration between the printed matter and the pattern of the seal.

Figure 6:
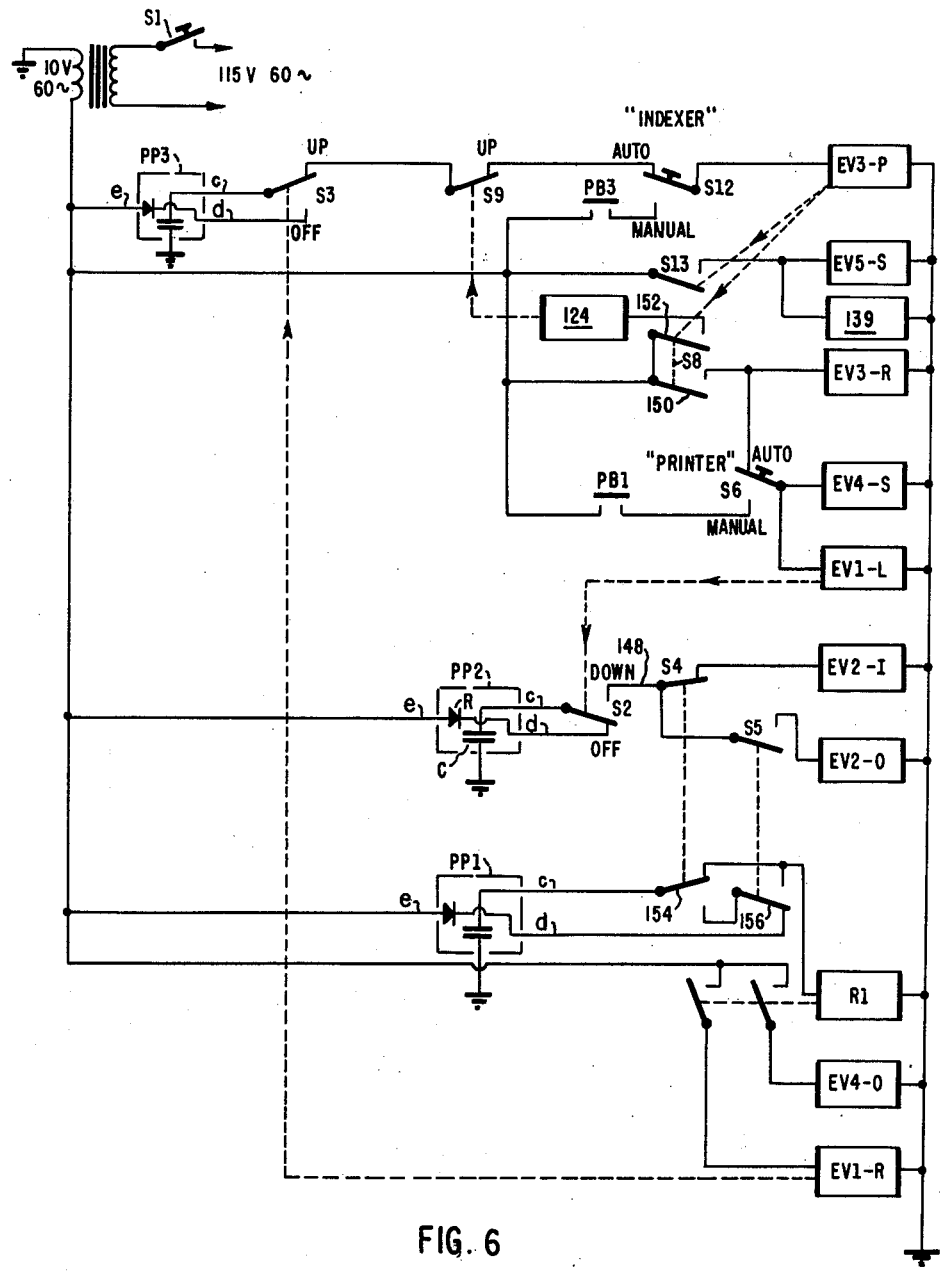

Other features of the invention reside in certain details of construction, arrangements of the parts and modes of operation which will become apparent from the following description of a preferred embodiment thereof, having reference to the appended drawings illustrating the same, in which:

FIG. 1 is a front elevation of the machine showing the principal parts thereof;
FIG. 1a is a detail elevation of the squeegee for the printer;
FIG. 2 is a plan view of the printer;
FIG. 3 is a plan view of a portion of the combined web showing the printed and fabricated parts disposed thereon;
FIG. 4 is a view in section of a completed book cover;
FIG. 5 is a plan view of said cover; and
FIG. 6 is a schematic electrical diagram showing the program control circuits for the machine.

The machine is first described in general, as follows.

*General Description*

FIGS. 1, 1a and 2 illustrate the preferred embodiment of the invention as adapted to the manufacture of finished plastic book covers of the type illustrated in FIGS. 4 and 5. Each of these covers, designated generally at 12, consists of a cover sheet 14 and two closing strips 16. The cover sheet is adapted to overlie both covers of a book and its backbone. The closing strips are sealed by fusion to the cover sheet along all contacting outer edges of the latter, leaving open edges 18 and thereby providing open-sided retaining pockets 19 for the covers of the book. The external surface of the cover sheet 14 bears printed matter in accurate register with the sealed edges.

The cover sheet 14 and the closing strips 16 are preferably of vinyl plastic composition. They are heat fusible and have the requisite dielectric properties whereby they are softened and fused in the presence of a high frequency dielectric field as hereinafter described. Preferably, the cover sheet 14 is of heavier gauge than the closing strips to compensate for its greater exposure to abrasion and tearing in use. The selection of vinyl plastic material, however, is not essential to the invention. Alternatively, other flexible plastic sheet material may be used, for example, polyethylene. In the case of polyethylene or other similar materials, the sealing operation hereinafter described may be altered by substituting contact heating for dielectric heating.

Referring to FIG. 1 which shows the machine in general organization, there is provided a mill roll 20 from which a cover sheet web 22 is fed through the machine from left to right as viewed in the drawing. The web 22 is preferably slightly wider between the margins than the dimension of the cover 12 extending therebetween. This web passes through the motor-driven rolls 23 of an unreeler which provides a relatively constant bight B in the web, the bight being equal to or slightly greater in developed length than the web length allocated to each individual book cover. Beneath the roll 20 are supported two mill rolls 24 from which a pair of closing strip webs 26 are fed to an idler roll 28, and over this idler to a second idler roll 30 where they are brought into contact with the web 22. It will be understood that these webs may also be fed through unreelers, if desired.

The machine comprises three main sections, these being a printer 32, a sealer 34 and an indexer 36. The printer applies the printed matter to the cover sheet web 22 and the sealer seals the cover sheet web to the closing strip webs to form a combined web 38 by means of dielectric heat so applied as to provide a so-called "tear-seal" 40 around the outline of each cover. This "tear-seal" is such that minute connections remain between each cover and the combined web, but each cover can be easily removed from the web by manually or mechanically poking out one corner and withdrawing the piece from the web with a tearing motion. The indexer 36 advances the combined web by pulling it intermittently in timed relation to the automatic cycles of the printer and sealer as hereinafter more fully described. The indexer is not required to overcome the inertia of the roll 20 because of the length of the bight B, which is maintained by a motor M through a lever 41, which in turn opens a switch in the motor circuit when the desired length of bight it attained. The rolls 23 preferably have a speed slightly greater than the average rate of indexing of the webs. The combined web 38 passes through the indexer on to a table 42 at which one or more operators may strip the finished covers from the web.

The mechanical parts of the machine are next described in further detail.

*Printer*

The printer 32 is shown in front elevation and plan view in FIGS. 1 and 2, respectively, and a detailed view of the squeegee is shown in FIG. 1a. The printer has a frame 44 to support a vacuum table 46. Beneath this table is a closed vacuum chamber 48 communicating with the upper surface of the table 46 by means of numerous small suction ports 49. A blower 50 tends to withdraw air from the chamber 48. A vacuum control valve EV4, when open as illustrated, prevents any substantial vacuum from building up in the chamber. However, when the valve EV4 is closed, a vacuum is built up and firmly clamps the web 22 which overlies the ports 49. Solenoids EV4-S and EV4-O are energized as shown in FIG. 6 and hereinafter described, to shut and open the valve, respectively, that is, to apply and release the vacuum, respectively. The valve EV4, and all of the valves similarly illustrated and described below, have two stable positions, remaining in either the open or the shut position until moved to the opposite position by energization of the appropriate solenoid. The stability in either position is produced by the air pressure applied to the valve, in a well-known manner.

A screen frame 52 is provided with hinges 54 which are secured to a convenient fixed support. This frame may be elevated to a raised position as shown in FIG. 1, or lowered to a position in which it lies at an adjustable height above the table 46, by means of a pneumatic piston 56. The means for adjusting this height are of conventional form and are not illustrated. In the "up" position the frame releases a limit switch S3 to cause it to operate its contacts, while in the "down" position the frame actuates a limit switch S2. The piston 56 is controlled by a solenoid-operated valve EV1 having solenoids EV1-L and EV1-R. The arrow associated with the valve EV1 designates continuously-applied pneumatic pressure and the other connection to the valve designates an exhaust opening to atmosphere. It will be understood that the same conventions apply to the other pneumatic valves hereinafter described. The connection of the piston 56 to the frame 52 is made by means of a hinge 58.

The frame 52 supports a silk screen 60 of a conventional type, the screen being stretched on the frame in position to overlie the web 22 and the frame is lowered. The frame also supports four posts 62 between which are suspended a pair of rigid slide bars 64. Slides 66 received over these bars pivotally support a squeegee bar 68 shown in detail in FIG. 1a. This bar supports an inverted V-shaped member 69 to which two flat squeegees 70 are in turn secured by means of a screw clamp 71. As indicated below, this form of construction provides advantageous ink control by preventing the ink from running back over the screen when the automatic operation is interrupted, for servicing the underside of the screen or otherwise. The bar 68 has a rocker arm 72 operated by a pneumatic piston 74 to rock the squeegee in one direction when the bar traverses "in" (i.e., upwardly as viewed in FIG. 2), and in the opposite direction when the bar traverses "out" (i.e., downwardly as viewed in FIG. 2). These rocking movements are arranged to be completed a short time before the bar 68 traverses the printing portion of the screen. Connections a and b for operating the piston 74 are shown in the upper part of FIG. 2 and are hereinafter more fully described. The "in" and "out" strokes of the squeegee alternate in printing the successive frames on the web; that is, if an "in" stroke prints a particular frame, an "out" stroke prints the next frame, and and so on. It will be understood that provision is made in a conventional manner to apply a puddle of printing ink to the screen in front of the squeegee.

The squeegee bar 68 is operated by a pair of pneumatic pistons 76 supported on extensions 78 from the frame 52. These pistons are connected in parallel with the piston 74 as indicated by common connections a and b. The pistons are controlled by a solenoid-operated valve EV2 having solenoids EV2-I and EV2-O which are energized to cause the squeegee to stroke "in" and "out," respectively. Limit switches S4 and S5 are supported on the frame 52 in position to be actuated by an arm 80 extending from one of the slides 66. Actuation of the switch S4 indicates that the squeegee has completed an "out" stroke, while actuation of the switch S5 indicates that the squeegee has completed an "in" stroke. While the squeegee is in motion between the limit switches, neither is actuated.

The squeegee bar is arrested at the end of each stroke by catch springs 82.

*Sealer*

The sealer 34 comprises a frame 84 having a table 86 over which the webs 22 and 26 are drawn in close relationship. The table is electrically grounded to the frame and constitutes one electrode of the dielectric sealing apparatus. Above the table an insulated electrode 88 is supported, with means described below for adjustment longitudinally and transversely in respect to the web, on a fixed arm 90 which extends from the frame over the table. The arm supports a pneumatic cylinder 92. A piston 94 received in the cylinder extends downwardly from the arm and supports a plate 96 by means of bolts 98. The plate 96 carries an adjustment assembly designated generally as 100, comprising a longitudinally-movable plate 102 adjustable by means of a thumb screw 104, and a transversely-movable plate 106 adjustable by means of a thumb screw 108. The plate 106 supports an electrode assembly 110 upon which the electrode 88 is secured. The assembly 110 also insulatedly supports a rod 112 carrying a thin plate 114 which passes under the combined web 38. The function of the plate 114 is to lift the combined web free of the table after each heat sealing operation and before each feeding operation when the electrode 88 is raised.

A bracket 116 is secured to the piston 94 and supports a limit switch 118. When the electrode 88 is in its upper position as illustrated, an end of the bracket actuates a limit switch S9; and when the electrode 88 reaches a predetermined lower position in which the necessary sealing pressure has been developed on the web, an arm 122 actuates the switch 118. Solenoids 124 and 126 which control a pneumatic valve 128 are also provided in association with the cylinder 92. These switches and valves are associated with electrical controls which operate in a cycle as follows: With the electrode 88 in its upper position as illustrated, the solenoid 124 is energized to initiate the cycle. The electrode 88 is lowered, and when the latter reaches its lowest position in which it applies pressure to the webs, the switch 118 is actuated to apply a voltage of high frequency between the electrode 88 and the table 86 for a measured period of time, for example a few seconds, after which the voltage is removed and the solenoid 126 is energized. This solenoid operates the valve 128 to apply pressure to the cylinder 92 to raise the electrode 88 to the position in which the switch S9 is actuated, thereby signalling completion of the cycle. The circuits and connections which are employed in carrying out the above-described cycle are common in the art and are therefore described below and illustrated only in their relation to the automatic cycling circuit of the full machine as shown in FIG. 6.

*Indexer*

The indexer 36 includes a pair of feed rolls 128 and 130 which are spring-pressed together in a conventional manner (not shown) to form a bite. The combined web 38 passes around the roll 128, through this bite, over the roll 130 and onto the table 42. A shaft 132 passes through the roll 128 and engages with it through a one-way clutch 134 of any preferred conventional form. Thus the shaft 132 drives the roll 128 only when rotated counterclockwise as viewed in the drawing, that is, in the direction to pull the web from left to right. A pinion 136 is secured to the shaft 132 and engages a rack 138. The rack is driven pneumatically by a cylinder 140, the cylinder being controlled by solenoid-operated valves EV3 and EV5. Upon energization of a solenoid EV3-P the rack is raised and the web feeds; and upon energization of a solenoid EV3-R the rack is lowered and the web remains stationary. A brake solenoid 139 or any equivalent device is arranged to operate directly against the roll 128 or the shaft to which it is keyed.

Preferably, the brake is of the form which applies adjustable pressure which may be varied by the current applied to its actuating circuit. Such brakes are well known to those familiar with the art and are not described herein in further detail.

Above the rack a fixed post 142 supports an adjustable bracket 144. This bracket supports a pair of limit switches S8 and S13. The switch S13 is actuated when the web has been fed a distance slightly less than the full amount required, and the switch S8 is actuated when the exact length of web has been fed. The feeding movement is precisely determined by the position of an abutment 146 on the bracket, which stops the rack 138 in its upward movement. The position of the bracket 144 is adjustable by means of a clamp screw 147, to permit adjustment of the stroke length, and hence of the length of web indexed.

It will be understood that the rates of travel of all air cylinders described above are regulated by adjustable throttles in their exhaust ports. In addition, the cylinders may provide a cushion action as their pistons approach the stroke limit, by means of air entrapped in front of the pistons. These provisions are not further described herein as they are common in certain types of known pneumatic control systems.

*Automatic Operation*

The circuit diagram of the machine, except for the internal wiring of the sealer described above in general terms, is shown in FIG. 6. The automatic cycle is first described. In this cycle, keys S12 and S6, respectively designating the "indexer control switch" and the "printer control switch," are in their "auto" positions. The circuit is shown in the condition reached at the moment before a control power key S1 is closed.

Certain elements in the circuit are energized by three power pulse units PP1, PP2 and PP3, each having leads c, d and e for external connection and being grounded. The operation of these units may be explained by reference to the unit PP2, for example, which has its c and d leads connected to the blade and one contact of the switch S2. The e lead is connected to the alternating current voltage source as illustrated. While the circuit is in the position shown, current passes through the unit from the e lead to ground and stores a charge on a condenser C through the connection between the c and d leads in the switch S2 and a half-wave rectifier R. When the switch S2 is moved to the position marked "down," the condenser C discharges through the c lead, a lead 148 and a load circuit to ground. This discharge comprises a pulse of current which actuates the load device. The unit recharges as soon as the switch S2 is returned to its "off" position.

The automatic cycle begins with closure of the key S1. The position of the switches S3 and S9 indicate, respectively, that the frame 52 on the printer is in its "up" position, and that the indexer is in its down or "reset" position with the electrode 88 on the sealer in its "up" position.

A pulse from the unit PP3 therefore reaches the solenoid EV3-P, which operates the valve EV3 to raise the rack 138 and feed the webs.

When the feeding movement is nearly completed, the rack 138 actuates the switch S13. This switch operates to slow down the roll 128 sufficiently to prevent overfeeding of the web by energizing parallel-connected solenoids EV5-S and 139. The solenoid EV5-S operates a valve EV5 which introduces a constriction in the exhaust passage from the cylinder 140. The brake solenoid 139 brakes the roll 128 directly or through the shaft to which it is keyed.

When the rack reaches its limiting position, the switch S8 is actuated. This switch initiates four operations simultaneously. First, through contacts 150 the solenoid EV3-R is energized to return the rack to its lower position. Second, through the contacts 150 and the key S6 the solenoid EV1-L is energized to lower the frame 52 of the printer onto the web. Third, through contacts 152 the solenoid 124 is energized to lower the electrode 88 onto the web and thereby to initiate the sealing cycle. Fourth, through the contacts 150 and the key S6, the solenoid EV4-S is energized to close the vacuum control valve EV4 and thereby to clamp the web.

When the frame 52 on the printer reaches its "down" position the switch S2 is energized and a pulse is sent from the unit PP2 either to the solenoid EV2-I or to the solenoid EV2-O, depending upon the position of the switches S4 and S5. If the squeegee bar is then in its "in" position the switch S5 is actuated to its closed position, the switch S4 is open and the solenoid EV2-O is energized to cause the squeegee bar to move "out." Conversely, if the squeegee bar is then in its "out" position the switch S4 is actuated to its closed position as illustrated in FIGS. 2 and 6, the switch S5 is open and the solenoid EV2-I is energized to cause the squeegee bar to move "in." In either case, the cylinder 74 is actuated at the appropriate connection a or b to tilt the squeegee in the correct direction for the required stroke, and the squeegee passes once over the web and prints the pattern in the screen 60 thereon.

As the squeegee moves across the web (assuming for example that the switches S4 and S5 were in their illustrated positions at the beginning of the stroke) the switch S4 becomes unactuated and its contacts 154 close the circuit between the c and d leads of the pulse unit PP1. When the squeegee reaches the end of its stroke the switch S5 is actuated and a relay R1 receives a pulse from the unit PP1 through the contacts 154 and contacts 156. A similar operation occurs if we assume instead that the switches S4 and S5 were in the opposite positions to those illustrated at the beginning of the stroke. The relay R1 in turn momentarily closes its contacts to energize solenoids EV4-O and EV1-R, which respectively open the vacuum control valve EV4 on the printer and raise the screen frame 52. When the screen frame reaches its "up" position, the "up" contacts of the switch S3 are again closed. A new cycle automatically begins as soon as the switches S3 and S9 are simultaneously actuated. The switch S9 is actuated to signify completion of a sealing cycle as previously described.

It will be understood that according to the program of operations described above, the squeegee moves once across the screen to print each cover. However, by suitable changes in the program embodied in the circuit of FIG. 6, the squeegee may be arranged to stroke once in each direction across the screen for each cover; and indeed, the screen may be raised above the web on one of the strokes, in accordance with a procedure well known in the silk screen art as "wet-back" printing. These changes in the cycle of operations may be dictated by the choice of material to be printed upon or the printing effect desired. Also, other printing procedures may be effected, if desired.

Single-Cycle Operation

If it desired to operate the machine in a single cycle for any reason, this may be accomplished by means of a pushbutton PB3 and a key S12. First, the key S12 is moved to its "manual" position, thereby disabling the starting circuit for the automatic cycle including the switches S3 and S9. With the printer, sealer and indexer in the starting positions, the pushbutton PB3 is then depressed and held until the indexer has operated the switches S13 and S8, signifying completion of an indexing movement of the web. Once the switch S8 is actuated, the pushbutton PB3 is released. Actuation of the switch S8 automatically causes the indexer to reset, and operates the sealer and printer as described above under "Automatic Operation," thus completing the cycle. However, a new cycle is not initiated until the pushbutton PB 3 is again depressed.

Jog Operation

If it is desired to operate the machine for only a part of a single cycle, that is, to index the web, to complete a sealing operation and to stop before the printing operation, this may be accomplished by means of the pushbutton PB3, a pushbutton PB1, the key S12 and a key S6. First, the keys S12 and S6 are moved to the "manual" positions. With the printer, sealer and indexer in the starting positions, the pushbutton PB3 is then depressed and held until the indexer has operated the switches S13 and S8, signifying completion of an indexing movement of the web. Once the switch S8 is actuated, the pushbutton PB3 is released. Actuation of the switch S8 automatically causes the indexer to reset and operates the printer.

The operation is stopped at this point, and the parts remain stationary. The same steps may then be repeated by again depressing the pushbutton PB3; or the pushbutton PB1 may be depressed. In the latter case the printing operation is started and proceeds until completion, whereupon the machine again comes to a stop, signifying completion of one full cycle. The same procedure may be followed with succeeding cycles, if desired.

From the foregoing description, it will be appreciated that the described machine prints, combines the webs and seals them with accurate registration of the printed matter to the margins of the cover. This accuracy resides in and depends upon the accuracy with which the indexer advances the webs. The indexer is of the intermittent, overriding clutch type, which advances precisely to the position corresponding to engagement of the rack 138 with the abutment 146. The inertia of the roll 128, which tends to cause it to overrun its limiting position through the clutch 134, is overcome through the use of the brake solenoid 139 and the drive slow-down valve EV5 associated with the switch S13.

Thus, although the selected web material may be of an easily stretchable character, this does not materially affect the registration because the machine is so designed as to apply a minimum of tension to the portions between the unreeler rolls and the table 42.

It will be further understood that, while the invention has been described with reference to a preferred embodiment thereof, various modifications in and arrangements of the parts may be effected as hereinabove described, or in accordance with knowledge familiar to those skilled in this art, without departing from the spirit or scope of this invention.

Having thus described the invention, I claim:

1. Intermittent indexing means for a web of flexible, stretchable sheet material having, in combination, a toothed driving element with means to move said element an accurately predetermined distance, an abutment defining the limit of movement of said element, switch means adapted to be operated by movement of said element to a predetermined displacement from said abutment, a pinion engaged with said element, a pair of rolls forming a bite engaging the web, unreeling means to maintain a constant bight in the web in advance of said pair of rolls, a plurality of stations successively operatively associated with the web intermediate the unreeling means and said pair of rolls, overriding clutch means engaging said pinion with one of said rolls, and a brake actuated by said switch means to engage one of said rolls.

2. Intermittent indexing means for a web of flexible, stretchable sheet material having, in combination, a toothed driving element with means to move said element an accurately predetermined distance, a member having an abutment defining the limit of movement of said element and switch means operable by said element in predetermined relation to the abutment, means to adjust the position of said member to vary the length of web indexed, a pinion engaged with said element, a pair of rolls forming a bite engaging the web, unreeling means to maintain a constant bight in the web in advance of said pair of rolls, a plurality of stations successively operatively associated with the web intermediate the unreeling means and said pair of rolls, overriding clutch means engaging said pinion with one of said rolls, and a brake actuated by said switch means to engage one of said rolls.

3. The combination according to claim 2, in which the means to move the driving element comprise a cylinder and a piston connected with said element, means to apply fluid pressure to the cylinder, and means to constrict the passage of fluid from one side of the piston when said element approaches its limit of movement.

4. Intermittent indexing means for a web of flexible, stretchable sheet material having, in combination, a toothed driving element, means to move said element an accurately predetermined distance including a cylinder and a piston connected with said element, means to apply fluid pressure to the cylinder and means operable to constrict the passage of fluid from one side of the piston, a member having an abutment defining the limit of movement of said element and switch means operable by said element in predetermined relation to the abutment, means to adjust the position of said member to vary the length of web indexed, a pinion engaged with said element, a pair of rolls forming a bite engaging the web, unreeling means to maintain a constant bight in the web in advance of said pair of rolls, a plurality of stations successively operatively associated with the web intermediate the unreeling means and said pair of rolls, overriding clutch means engaging said pinion with one of said rolls, and a brake actuated by said switch means to engage one of said rolls, said switch means also operating said constricting means.

References Cited in the file of this patent

UNITED STATES PATENTS

| Number | Name | Date |
|---|---|---|
| 1,348,976 | Antman | Aug. 10, 1920 |
| 1,724,047 | Schramm | Aug. 13, 1929 |
| 2,069,885 | Jeffreys | Feb. 9, 1937 |
| 2,127,028 | Hayssen | Aug. 16, 1938 |
| 2,326,931 | Dalton et al. | Aug. 17, 1943 |
| 2,517,672 | Jenkins | Aug. 8, 1950 |
| 2,556,787 | Bach et al. | June 12, 1951 |
| 2,597,634 | Grevich | May 20, 1952 |
| 2,628,835 | Dickerman | Feb. 17, 1953 |
| 2,648,097 | Kritchever | Aug. 11, 1953 |
| 2,651,708 | Mason et al. | Sept. 8, 1953 |
| 2,669,453 | Gorbantenko | Feb. 16, 1954 |
| 2,674,093 | Solmer | Apr. 6, 1954 |
| 2,705,993 | Mann et al. | Apr. 12, 1955 |
| 2,706,165 | Korsgaard | Apr. 12, 1955 |
| 2,819,070 | Herr | Jan. 7, 1958 |
| 2,895,534 | Steidinger | July 21, 1959 |
| 2,947,537 | Littell | Aug. 2, 1960 |
| 2,978,158 | Herr | Apr. 4, 1961 |